US010773922B2

(12) United States Patent
Jiang et al.

(10) Patent No.: US 10,773,922 B2
(45) Date of Patent: Sep. 15, 2020

(54) DRIVE AND CONTROL FOR SIX-PHASE ELECTRICAL MACHINES WITH NEGLIGIBLE COMMON-MODE VOLTAGE

(71) Applicant: OTIS ELEVATOR COMPANY, Farmington, CT (US)

(72) Inventors: Dong Jiang, Manchester, CT (US); Shashank Krishnamurthy, Glastonbury, CT (US); Daryl J. Marvin, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 516 days.

(21) Appl. No.: 15/549,076

(22) PCT Filed: Feb. 3, 2016

(86) PCT No.: PCT/US2016/016308
§ 371 (c)(1),
(2) Date: Aug. 4, 2017

(87) PCT Pub. No.: WO2016/126782
PCT Pub. Date: Aug. 11, 2016

(65) Prior Publication Data
US 2018/0022576 A1 Jan. 25, 2018

Related U.S. Application Data

(60) Provisional application No. 62/112,272, filed on Feb. 5, 2015.

(51) Int. Cl.
*B66B 1/30* (2006.01)
*H02P 27/08* (2006.01)
*H02P 21/00* (2016.01)

(52) U.S. Cl.
CPC .............. *B66B 1/306* (2013.01); *H02P 21/00* (2013.01); *H02P 27/08* (2013.01)

(58) Field of Classification Search
CPC ........... B66B 1/306; H02P 21/00; H02P 27/08
(Continued)

(56) References Cited

U.S. PATENT DOCUMENTS 3,819,992 A * 6/1974 Opal ....................... H02P 27/08
318/798
4,511,834 A * 4/1985 Studtmann ............ H02P 25/024
318/700
(Continued)

FOREIGN PATENT DOCUMENTS

CN 101953064 A 1/2011
WO 2014182272 A1 11/2014

OTHER PUBLICATIONS

Oriti et al. "An inverter/motor drive with common mode voltage elimination", Industry Applications Conference, 1997. Thirty-Second IAS Annual Meeting, Conference Record of the 1997 IEEE, Oct. 5-9, 1997, vol. 1, pp. 587-592.
(Continued)

*Primary Examiner* — David S Warren
(74) *Attorney, Agent, or Firm* — Cantor Colburn LLP

(57) ABSTRACT

A drive and motor system and method for a six phase machine with negligible common-mode voltage is provided. The six-phase machine includes six phase windings divided into at least two windings groups configured to generate a zero common-mode pulse width modulation. The drive and motor system and method can also include at least one direct current source and a six phase inverter switching between positive and negative power of the at least one direct current source.

11 Claims, 8 Drawing Sheets

(58) Field of Classification Search
USPC .......................................................... 187/297
See application file for complete search history.

(56) References Cited

U.S. PATENT DOCUMENTS

| | | | | | |
|---|---|---|---|---|---|
| 5,852,558 | A * | 12/1998 | Julian | .................... | H02M 1/12 363/132 |
| 5,905,644 | A * | 5/1999 | Blasko | .................. | H02M 7/219 318/801 |
| 6,008,616 | A * | 12/1999 | Nagayama | ............ | B60L 15/025 318/773 |
| 7,663,268 | B2 * | 2/2010 | Wen | ........................ | H02P 25/22 307/82 |
| 7,990,098 | B2 * | 8/2011 | Perisic | ..................... | H02P 4/00 318/801 |
| 8,415,904 | B2 * | 4/2013 | Rippel | ..................... | H02P 6/14 318/139 |
| 8,773,050 | B2 * | 7/2014 | Klatt | ........................ | B60Q 1/30 318/400.01 |
| 9,647,600 | B2 * | 5/2017 | Duguey | ................... | H02P 25/22 |
| 9,985,566 | B2 * | 5/2018 | Jiang | ....................... | B66B 1/308 |
| 10,396,694 | B2 * | 8/2019 | Ren | .......................... | F03D 9/255 |
| 10,516,361 | B2 * | 12/2019 | He | ........................... | H02P 29/50 |
| 2003/0193253 | A1 * | 10/2003 | Arimitsu | ................. | B60L 15/02 310/114 |
| 2007/0200346 | A1 * | 8/2007 | Kanazawa | ............ | H02J 7/1492 290/40 B |
| 2007/0290640 | A1 * | 12/2007 | Williams | ............ | H02M 7/5387 318/400.42 |
| 2008/0055947 | A1 * | 3/2008 | Wen | ........................ | H02M 7/49 363/65 |
| 2010/0148712 | A1 * | 6/2010 | Klatt | ........................ | B60Q 1/30 318/400.42 |
| 2011/0316461 | A1 * | 12/2011 | Rippel | ..................... | H02P 6/14 318/400.29 |
| 2014/0111066 | A1 | 4/2014 | Ito et al. | | |
| 2015/0349598 | A1 * | 12/2015 | Gieras | ...................... | H02K 3/28 310/68 D |
| 2016/0094176 | A1 * | 3/2016 | Tolksdorf | ................ | H02P 27/05 318/723 |
| 2016/0141997 | A1 * | 5/2016 | Duguey | ................... | H02P 25/22 318/400.02 |
| 2016/0329705 | A1 * | 11/2016 | Lacaux | .................. | H02M 1/126 |
| 2016/0352278 | A1 * | 12/2016 | Jiang | ....................... | B66B 1/308 |
| 2017/0025970 | A1 * | 1/2017 | Horst | ...................... | H02M 1/15 |
| 2017/0093257 | A1 * | 3/2017 | Hirata | .................... | H02K 1/274 |
| 2017/0264226 | A1 * | 9/2017 | Santamaria | ............. | H02P 25/22 |
| 2018/0022576 | A1 * | 1/2018 | Jiang | ....................... | H02P 27/08 187/297 |
| 2018/0109175 | A1 * | 4/2018 | Horst | ...................... | H02M 1/15 |
| 2018/0109201 | A1 * | 4/2018 | Li | ........................... | H02M 7/487 |
| 2019/0109533 | A1 * | 4/2019 | Horst | ...................... | H02M 1/15 |
| 2019/0253015 | A1 * | 8/2019 | He | ..................... | H02P 21/0017 |
| 2019/0334420 | A1 * | 10/2019 | Hidaka | ................... | H02K 17/14 |
| 2019/0379251 | A1 * | 12/2019 | Islam | ....................... | H02K 3/12 |
| 2019/0381890 | A1 * | 12/2019 | Wang | .................... | B60L 15/007 |

OTHER PUBLICATIONS

International Search Report and Written Opinion of the ISA issued in related PCT Application No. US2016/016308 dated Jun. 1, 2016, 9 pages.

Kou et al., "Synchronous control of dual linear motors based on advanced space voltage vector switch table", 17th International Symposium on Electromagnetic Launch Technology, IEEE, Jul. 7, 2014, pp. 1-5.

Chinese First Office Aciton for application CN 201680008952.5, dated Jul. 24, 2019, 16 pages.

European Office Action for application EP 16708001.9, dated Jun. 26, 2019, 4 pages.

Orti, G. et al., "An Inverter/Motor Drive With Common Made Voltage Elimination", IEEE Industry Application Society Annual Meeeting, 1997, 6 pages.

* cited by examiner

500a

500b

600a

600b

DRIVE AND CONTROL FOR SIX-PHASE ELECTRICAL MACHINES WITH NEGLIGIBLE COMMON-MODE VOLTAGE

CROSS-REFERENCE TO RELATED APPLICATIONS

The present application is a National Stage of International Application No. PCT/US2016/016308, filed on Feb. 3, 2016, which claims priority to U.S. Provisional Application No. 62/112,272, filed on Feb. 5, 2015, the contents of which are incorporated herein by reference in their entirety.

FIELD OF INVENTION

The subject matter disclosed herein relates generally to the field of elevators, and more particularly to a multicar, ropeless elevator system.

BACKGROUND

Ropeless elevator systems, also referred to as self-propelled elevator systems, are useful in certain applications (e.g., high rise buildings) where the mass of the ropes for a roped system is prohibitive and there is a desire for multiple elevator cars to travel in a single lane. There exist ropeless elevator systems in which a first lane is designated for upward traveling elevator cars and a second lane is designated for downward traveling elevator cars. A transfer station at each end of the hoistway is used to move cars horizontally between the first lane and second lane.

BRIEF DESCRIPTION OF THE INVENTION

According to one embodiment of the invention, a motor and drive system comprises at least one direct current source; a six phase inverter switching between positive and negative power of the at least one direct current source; and a six phase machine including six phase windings divided into at least two windings groups configured to result in a zero common-mode pulse width modulation across the at least two windings groups.

In the above embodiment, or in the alternative, common-mode noises can be conducted through the six phase windings of the six-phase machine through at least one parasitic capacitor to a ground during the zero common-mode pulse width modulation.

In the above embodiments, or in the alternative, the six phase windings can be distributed at a 60 degrees difference in space.

In the above embodiments, or in the alternative, the each windings group can form a three-phase, 120° phase-shift machine.

In the above embodiments, or in the alternative, the six phase windings can include at least two separate neutral connections, where a maximum modulation index is approximate to 1.15.

In the above embodiments, or in the alternative, a parasitic capacitance between windings and ground can be modeled as one common-mode capacitor for a common-neutral connection or two equal or substantially equal common-mode capacitors for two separate neutral connections.

In the above embodiments, or in the alternative, the six phase windings can include a common neutral connection, where a maximum modulation index is 1.

In the above embodiments, or in the alternative, the at least one parasitic capacitor can be a single parasitic common-mode capacitors that concentrates a common-mode capacitance from a common neutral connection.

In the above embodiments, or in the alternative, the motor and drive system can further comprise a six-phase power converter configured to drive the motor and drive system, wherein the six-phase power converter includes one phase-leg of two switches connected to one phase of the six phase windings In the above embodiments, or in the alternative, the six-phase power converter can include twelve switches.

In the above embodiments, or in the alternative, a switching pattern of the six-phase power converter can be arranged for the at least two windings groups.

In the above embodiments, or in the alternative, switching actions of the switching pattern can be complementary for the at least two windings groups to maintain a common-mode voltage at zero.

In the above embodiments, or in the alternative, the switching pattern can be generated by reversing duty cycles and carriers for a first group of the at least two windings groups when generating switching actions for a second group of the at least two windings groups.

In the above embodiments, or in the alternative, motor and drive system of any preceding claim can be included in a ropeless elevator system.

In the above embodiments, or in the alternative, a method comprising switching, by a six phase inverter of a motor and drive system, between positive and negative power of at least one direct current source; and effecting a zero common-mode pulse width modulation across at least two windings groups, by a six phase machine, in accordance with the switching by the six phase inverter, the six phase machine including six phase windings divided into the at least two windings groups.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
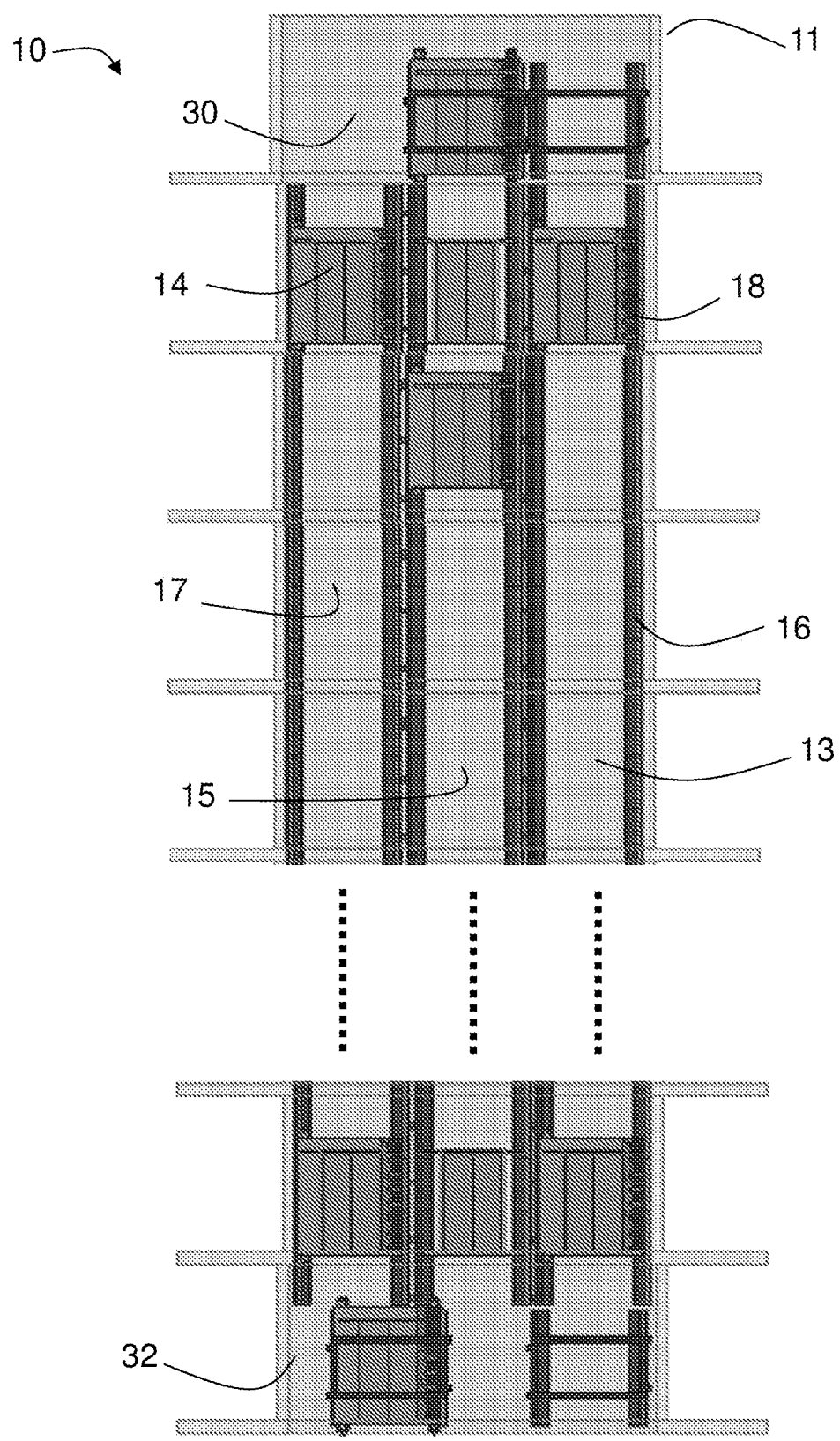
FIG. 1 depicts a multicar elevator system in an exemplary embodiment.

FIG. 1 depicts a multicar, ropeless elevator system 10 in an exemplary embodiment. Elevator system 10 includes a hoistway 11 having a plurality of lanes 13, 15 and 17. While three lanes are shown in FIG. 1, it is understood that embodiments may be used with multicar ropeless elevator systems that have any number of lanes. In each lane 13, 15, 17, cars 14 travel in one direction, i.e., up or down. For example, in FIG. 1 cars 14 in lanes 13 and 15 travel up and cars 14 in lane 17 travel down. One or more cars 14 may travel in a single lane 13, 15, and 17.

Above the top floor is an upper transfer station 30 to impart horizontal motion to elevator cars 14 to move elevator cars 14 between lanes 13, 15 and 17. It is understood that upper transfer station 30 may be located at the top floor, rather than above the top floor. Below the first floor is a lower transfer station 32 to impart horizontal motion to elevator cars 14 to move elevator cars 14 between lanes 13, 15 and 17. It is understood that lower transfer station 32 may be located at the first floor, rather than below the first floor. Although not shown in FIG. 1, one or more intermediate transfer stations may be used between the first floor and the top floor. Intermediate transfer stations are similar to the upper transfer station 30 and lower transfer station 32.

Cars 14 are propelled using a motor and drive system (e.g., a linear motor system) having a primary, fixed portion 16 and a secondary, moving portion 18. The primary portion 16 includes windings or coils mounted at one or both sides of the lanes 13, 15 and 17. Secondary portion 18 includes permanent magnets mounted to one or both sides of cars 14. Primary portion 16 is supplied with drive signals to control movement of cars 14 in their respective lanes.

The linear motor system of the ropeless elevator system can employ a power electronics inverter (e.g., as variable speed alternating drive (AC) motor drive) to improve the performance of the linear motor system. However, switching of power electronics devices in the motor drive includes inherent electromagnetic interference (EMI) problems. In general, EMI noise can be divided into two major groups: differential mode (DM) noise and common-mode (CM) noise. DM noises are conducted between phases. CM noises are conducted together with all phases through the parasitic capacitors to the ground. CM noises are with serious concern for motor drives because CM noises increase the EMI in the motor drive and damage the motor bearing and winding insulation. Unfortunately, solutions such as adding CM filters to attenuate CM noises are not viable in the linear motor system of the ropeless elevator system 10 due to the significant weight penalty of each CM filter significantly increase.

Figure 2:
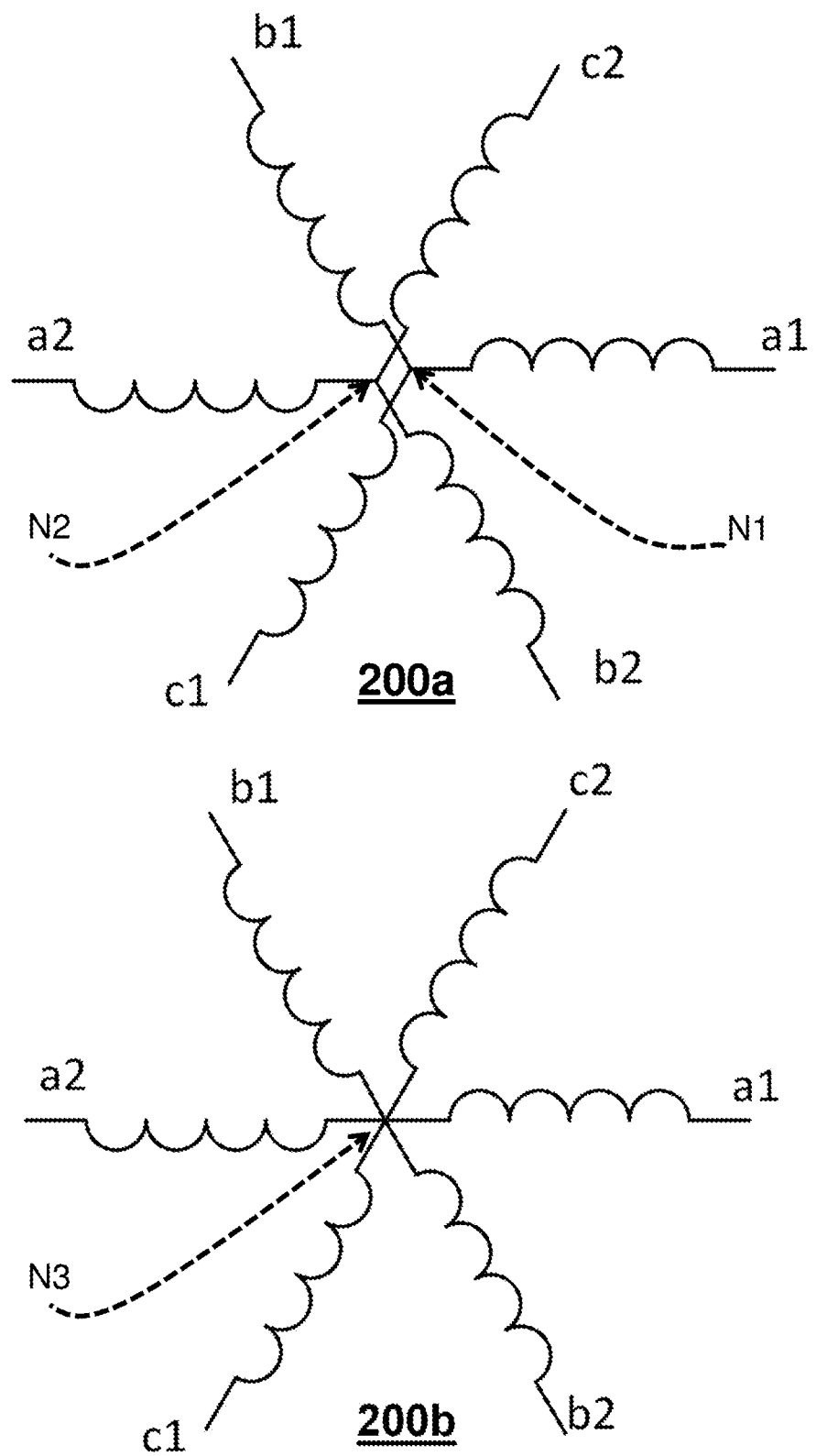
FIG. 2 shows of six-phase machine winding configurations in accordance with embodiments of the present invention.

In view of the above, embodiments of the present invention set forth a drive and motor system and/or method for a six phase machine with negligible CM voltage. The six-phase machine includes six phase windings. FIG. 2 illustrates six-phase machine winding configuration 200a, 200b with the six phase windings distributed at a 60 degrees difference in space. In both configurations, the six phase windings are divided into at least two groups: a first group being a1-b1-c1 and a second is a2-b2-c2. Each winding group forms a three-phase, 120° phase-shift machine.

Further, embodiments of the drive and motor system can utilize the six-phase machine with a separate neutral connection or a common neutral connection, where a maximum modulation index can be approximate to 1.15 (e.g., wherein an exact value is 2/sqrt(3)) with separate neutral connection and a maximum modulation index can be approximate to 1 with common neutral connection. For example, in the first configuration 200a, two neutral points N1, N2 for the two groups of windings can be separated. In the second configuration 200b, the neutral points for the two groups of windings are connected at neutral point N3.

The six-phase machine is also in electrical communication with a six phase inverter. In general, to produce a zero CM pulse width modulation (PWM), a space vector combination can be calculated with a first group of phases and be substantially or directly matched to complementary voltage vectors for a second group of phases. Note that, while the producing the zero CM PWM for the two groups of windings, the six phase windings may be divided into any number of groups. Further, the zero CM PWM is an active control signal produced by the drive and motor system (e.g., result in a zero common-mode pulse width modulation across the at least two windings groups).

Figure 3:
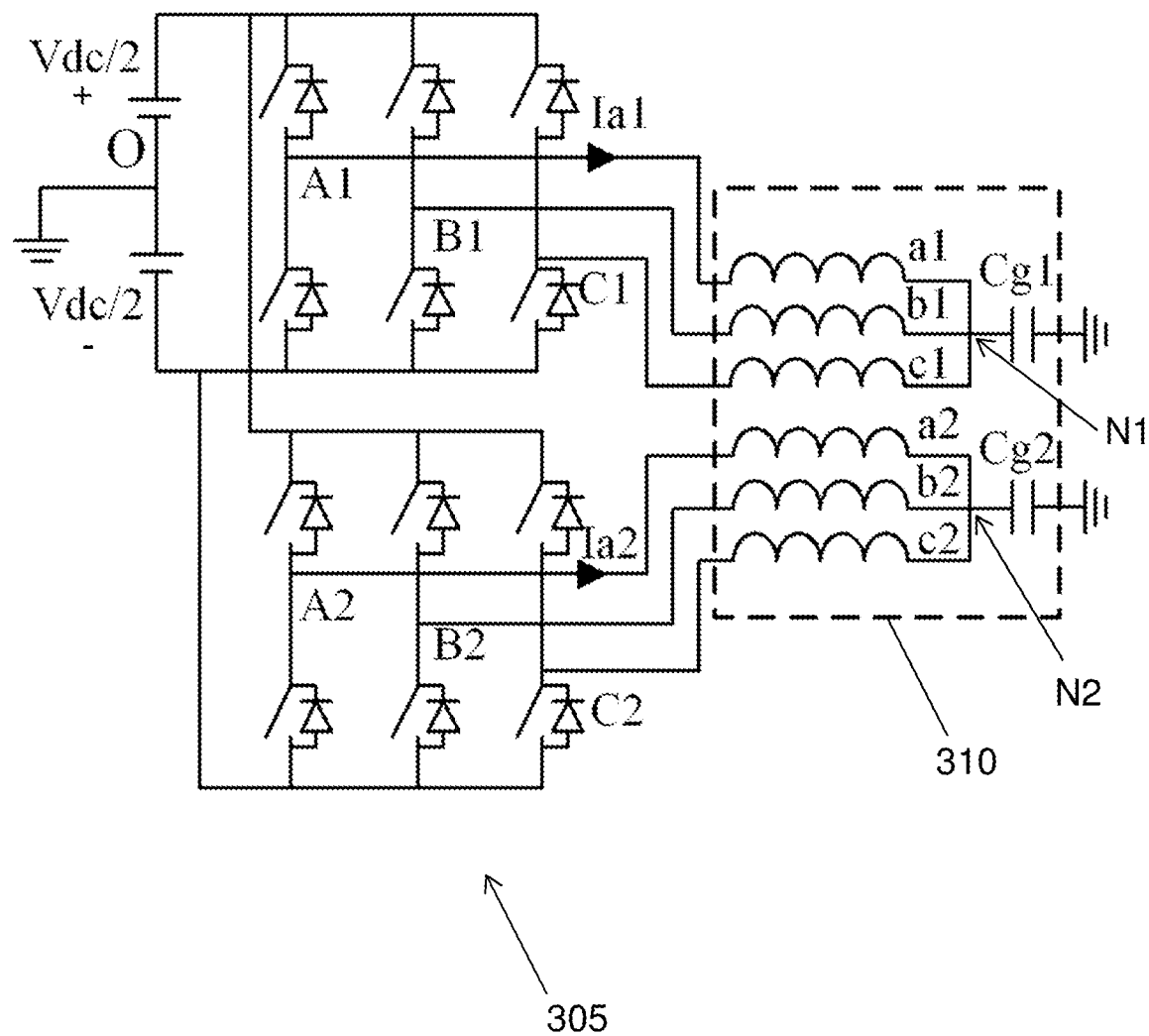
FIG. 3 illustrates a six-phase voltage source inverter with six-phase machine according to an embodiment of the invention.
Figure 4:
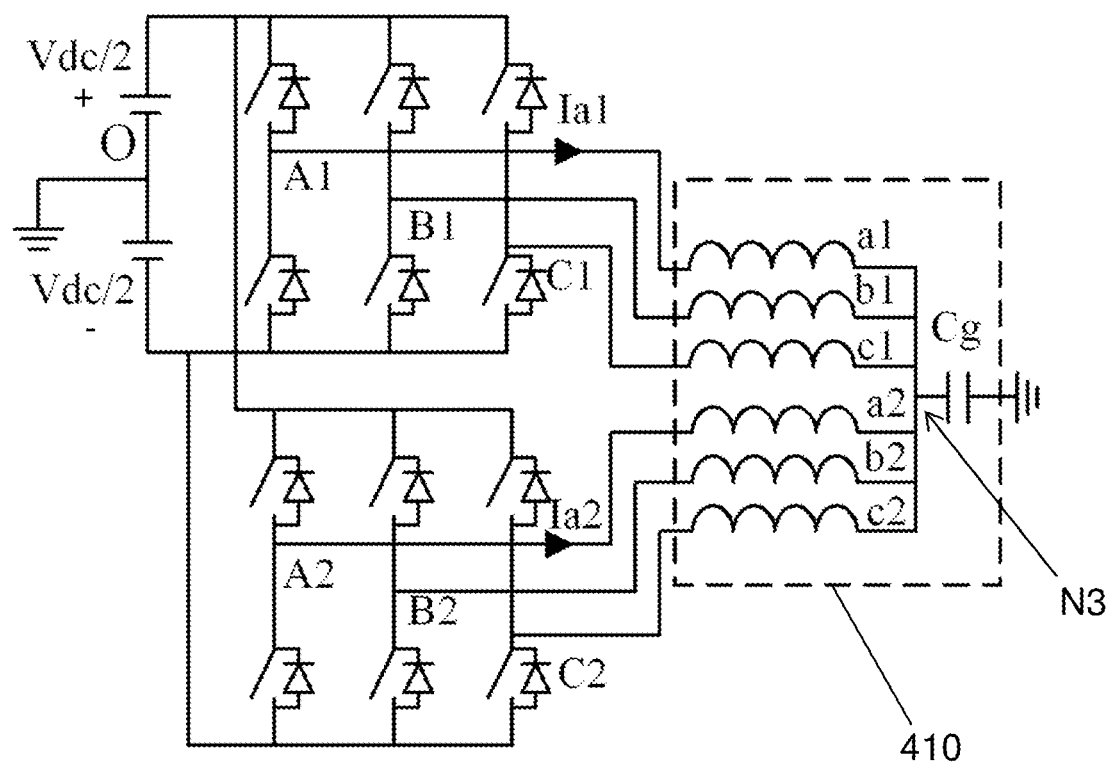
FIG. 4 illustrates another six-phase voltage source inverter with six-phase machine according to another embodiment of the invention.

FIGS. 3, 4 show six-phase voltage source inverters (VSIs) 305, 405 connected to six-phase machines 310, 410, together with the parasitic CM capacitors Cg1, Cg2, Cg. In operation, the inverter terminal voltages of each six-phase VSI 305, 405 are switching between positive and negative direct current link (Vdc/2+, Vdc/2−) and generating an EMI noise source. Further, CM noises are conducted through the motor windings of the six-phase machines 310, 410 and the CM parasitic capacitors Cg1, Cg2, Cg to the respective grounds (e.g., during the zero common-mode pulse width modulation).

The six-phase machine 310 illustrates the first configuration 200a with two separate neutral points N1, N2 for each group of windings. The six-phase machine 410 illustrates the second configuration 200b with a connected neutral point N3 for the windings. With the separate neutral points N1, N2, the CM capacitance of the parasitic CM capacitors Cg1, Cg2 are equal or substantially equal. With the connected neutral point N3, the CM capacitance is concentrated in the parasitic CM capacitor Cg. In this way, a parasitic capacitance between windings and ground can be modeled as one CM capacitor for common-neutral connection or two equal or substantially equal CM capacitors for separate neutral connection. In both cases, a CM voltage for the six-phase voltage VSIs can be expressed in equation (1).

$$V_{cm} = \frac{V_{A1} + V_{A2} + V_{B1} + V_{B2} + V_{C1} + V_{C2}}{6} \quad (1)$$

The drive and motor system can be driven by a six-phase power converter. The six-phase power converter includes at least one phase-leg of two switches connected to one phase of the six phase windings. In some embodiments, the six-phase power converter can include twelve switches with a pair of switches connected to a respective one winding of the six phase windings. The switching pattern of the six-phase power converter can be arranged for at least two groups of windings, which are located in opposite position with each other, where the switching actions are complementary so that the CM voltage for a full motor drive is kept/maintained to be zero. In this way, a switching pattern is achieved when duty cycles and carriers for the first group of windings are reversed together with generating switching actions for the second group of windings.

Figure 5:
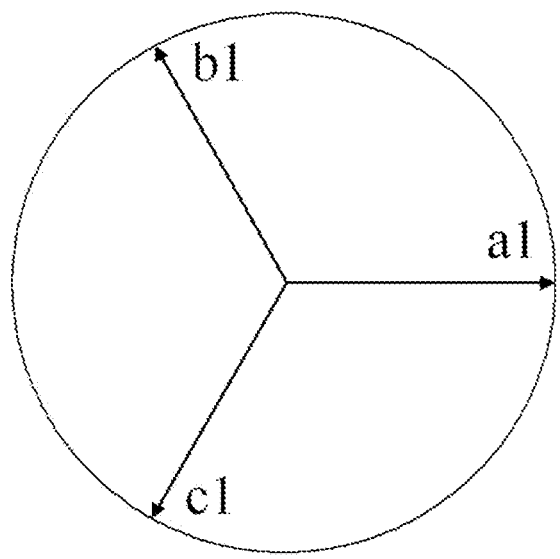
FIG. 5 illustrates configurations of windings in six-phase machine space in accordance with embodiments of the present invention.
Figure 5:
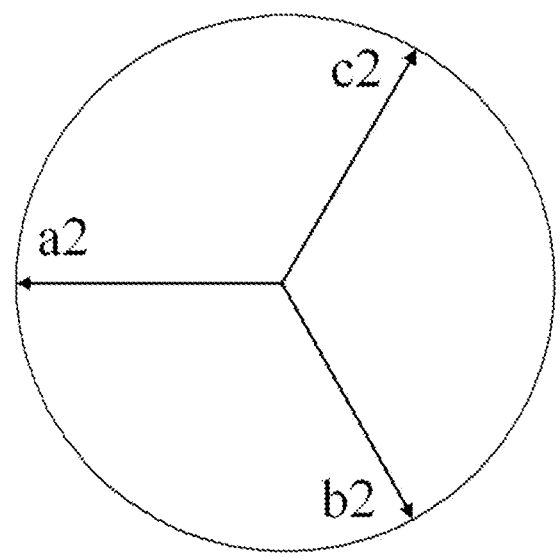

As shown in FIG. 5, based on the two winding space distribution 500a, 500b of the first and second groups, switch vectors are also calculated in equation (2), with equation (2a) for winding space distribution 500a and equation (2b) for winding space distribution 500b.

$$\begin{cases} V = [x1, x2, x3] * [1, \exp(j2\pi/3), \exp(j4\pi/3)] & (a) \\ V = [x1, x2, x3] * [-1, \exp(-j\pi/3), \exp(j\pi/3)] & (b) \end{cases} \quad (2)$$

In equation (2), x1, x2 and x3 are a switching status of a phase-leg, which are either 1 or 0. With these two equations, the voltage vectors for the two groups of inverter phases are shown in FIG. 6.

Figure 6:
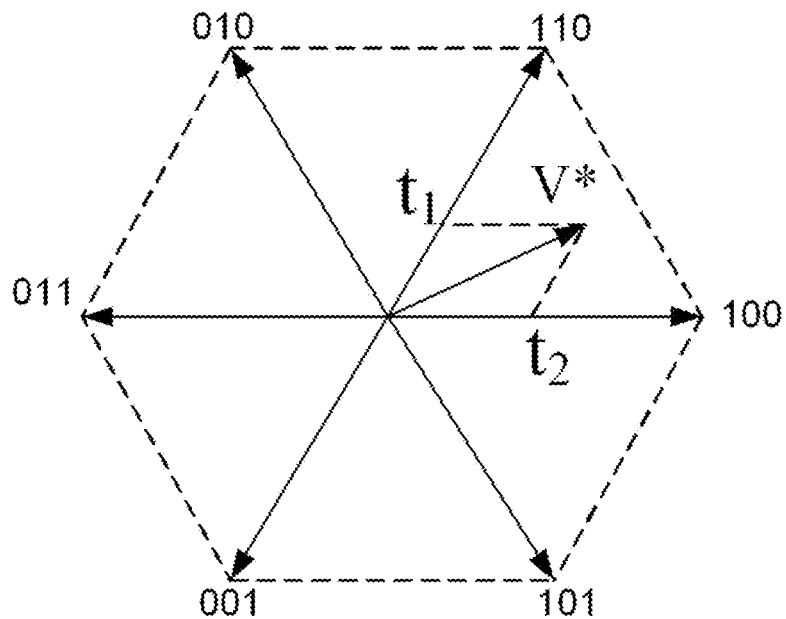
FIG. 6 illustrates voltage vectors for groups of inverter phases in accordance with embodiments of the present invention.
Figure 6:
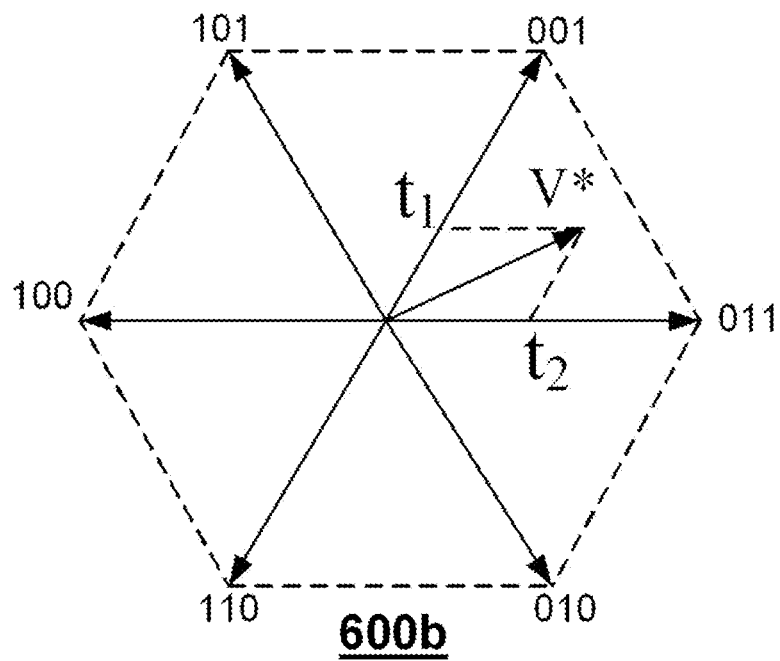

FIG. 6 illustrates voltage vectors for groups of inverter phases. FIG. 6 includes a first formation 600a of 6 voltage vectors for the first group of phases and a second formation 600b of 6 voltage vectors for the second group of phases. The 6 voltage vectors of the second formation 600b are exactly opposite from the first formation 600a. In turn, the complementary voltage vector in the second group of phases will achieve the same effect with the original voltage vector in the first group of phases. Note that a zero voltage vector 111 and 000 in two groups of phases are complementary, too.

To produce the negligible CM, a calculation of the duty cycle (e.g., with a −1~1 range) for the first group of phases is performed, while a duty cycle is directly reversed for the second group of phases. A triangle carrier for the second group of phases is also reversed with respect to a triangle carrier for the first group of phases. Then, a first switching function for the first group of phases is generated in a first comparator, and a second switching function for the second group of phases is generated in comparator. In turn, when the first and second switching functions are combined, a zero CM voltage is achieved.

Figure 7:
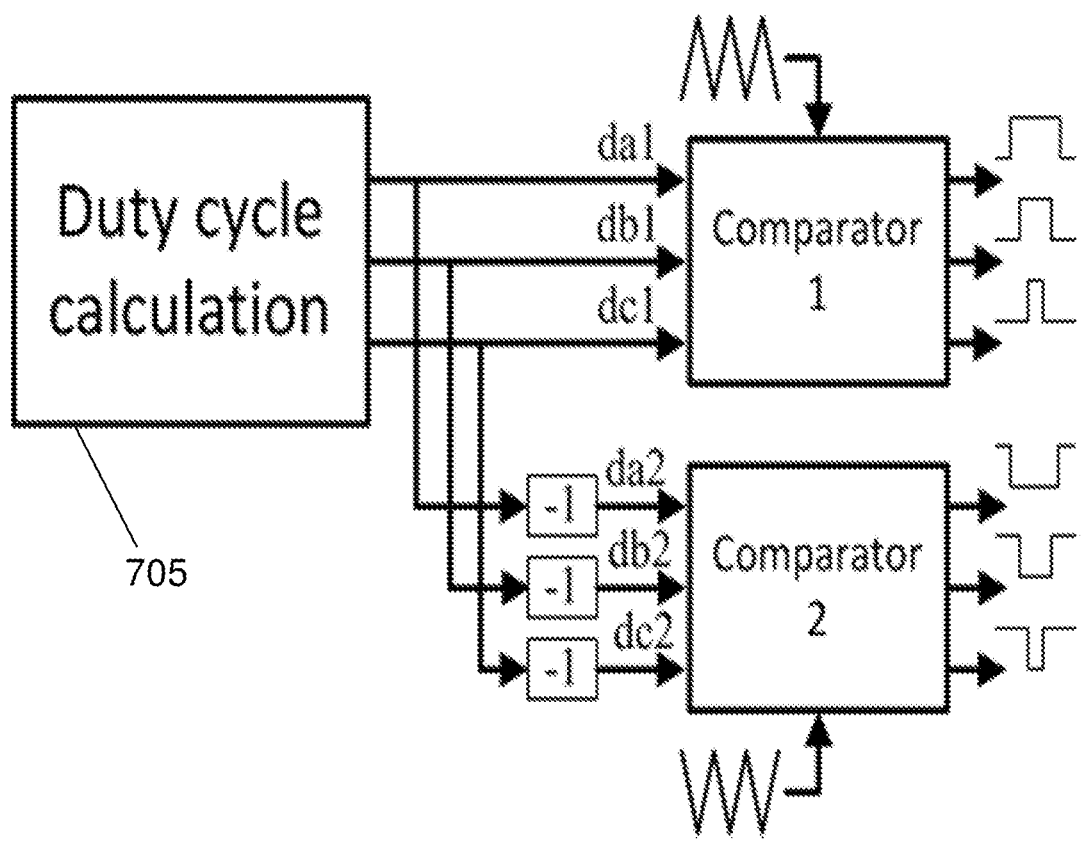
FIG. 7 illustrates a pulse width modulation generation for a six-phase motor drive according to an embodiment of the invention.

For example, FIG. 7 illustrates a pulse width modulation generation for a six-phase motor drive to achieve zero CM voltage. After calculation of the duty cycle calculation 705 (−1~1 range) of da1, db1 and dc1 for the first group of phases, the duty cycle is directly reversed for da2, db2 and dc2. The triangle carrier for da2, db2 and dc2 are also reversed from that of da1, db1 and dc1. Then, the switching function for first group of phases are generated in Comparator 1, and the switching function for the second group of phases are generated in Comparator 2.

With separate neutral points N1, N2 in FIG. 3, a general space vector PWM can be used in the duty cycle calculation in FIG. 7. In this way, the duty cycles (−1~1) of the first group windings are calculated and sent to Comparator 1, while the reversed duty cycles are sent to Comparator 2. Then the CM voltage in N1 and N2 will be complementary to each other. In this way, the CM voltage will be zero for the full motor drive in the whole period. With zero CM voltage, a phase current can include even less ripple and similar harmonics of other drive and motor systems.

Figure 8:
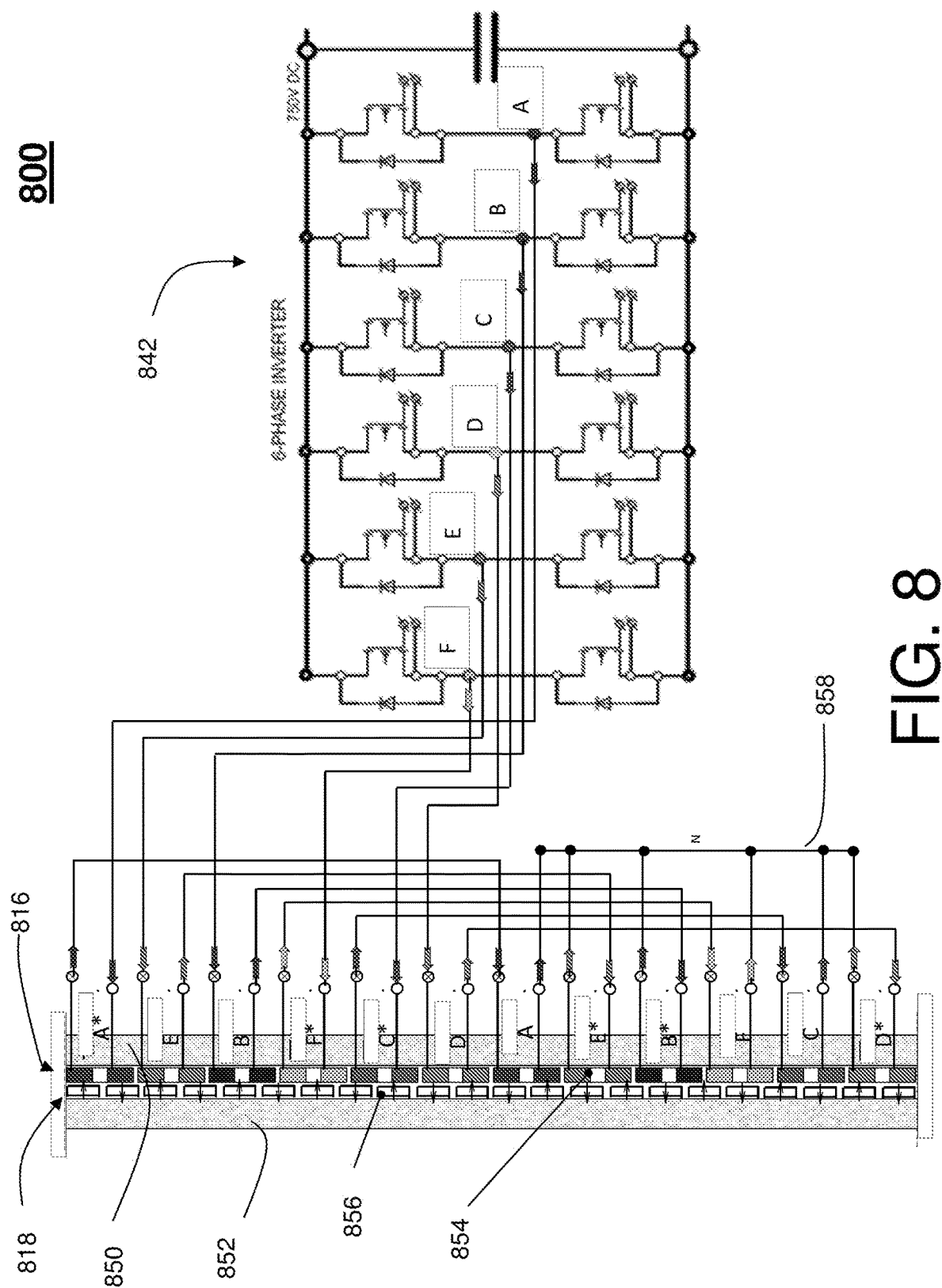
FIG. 8 depicts a drive and a section of the primary portion and the secondary portion of a linear propulsion system in an exemplary embodiment.

FIG. 8 is schematic diagram of a linear propulsion system 800 according to one embodiment of the motor and drive system described above. The linear propulsion system 800 includes a drive 842 (e.g., embodiment of the six-phase VSI 305, 405), a section of the primary portion 816, and a secondary portion 818 of the linear propulsion system. The drive 842 is a two level, six phase drive, have six phase legs labeled A, B, C, D, E, and F. It is understood that the drive 842 may be three level, or N-level, and embodiments are not limited to 2-level drives. In the depicted embodiment, the primary portion 816 of the linear propulsion system 800 includes twelve coils 854 designated as A*, E, B, F*, C*, D, A, E*, B*, F, C and D*. The letter designates which phase the coil belongs to, and the presence or absence of the * indicates the current direction. A pair of coils 854 is associated with each phase (e.g., A and A*). Current flow in coil A is in the opposite direction as current flow of coil A*. The primary portion 816 of the linear propulsion system can be core-less. Alternatively, the coils 854 of the primary portion 816 may be formed about ferromagnetic cores with concentric coils wound around primary teeth. The coils 854 may be also placed on a ferromagnetic flat support 850, forming toothless primary portion 816.

The coils 854 of the primary portion 816 are arranged in a star configuration, where coils for each phase (e.g., A and A*) are in electrical series from a respective phase leg of the drive 842 to a neutral point 858. It is understood that other coil configurations may be utilized other than star configuration.

The secondary portion 818 of the linear propulsion system 800 includes twenty two magnetic poles 856. The magnetic poles 856 may be arranged as shown in FIG. 8 using twenty two permanent magnets, arranged in alternating polarity facing the primary portion 716. In other embodiments, the twenty two magnetic poles 856 may be arranged as part of a Halbach array. The spacing of the permanent magnets or poles 856 (e.g., center-to-center) is referred to as the pole pitch. The spacing of the coils 854 (e.g., center-to-center) is referred to as the coil pitch. The ratio of the magnetic pole pitch to the coil pitch equals 6/11. Permanent magnets of the secondary portion 818 may be mounted on a ferromagnetic flat support 852. The secondary portion 818 may be positioned on one side of primary portion 816, or on both sides of the primary portion 816.

Although FIG. 8 depicts twelve coils and twenty two magnetic poles, the linear propulsion system may be generalized as having 12N coils and 22N magnetic poles, where N is a positive integer.

In view of the above, the technical effects and benefits of embodiments of the drive and motor system include eliminating common-mode voltage for the inverter output, significant reductions of CM EMI noise and CM current, eliminating a need for extra coupling inductors, reduction of damage of CM current to the motor insulation and bearing. Further, the technical effects and benefits of embodiments can include a six-phase voltage source inverter that eliminates a need for extra hardware modification due to the drive being based on a normal six-phase VSI, such as elimination of CM filter which in turn significantly increases power density, along with no need for a coupling inductor. Furthermore, technical effects and benefits of embodiments can include a six-phase machine with separate neutral connection or with a six-phase machine with common neutral connection.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A motor and drive system, comprising:
   at least one direct current source;
   a six phase inverter switching between positive and negative power of the at least one direct current source;
   a six phase machine including six phase windings divided into at least two windings groups configured to result in a zero common-mode pulse width modulation across the at least two windings groups;
   wherein the six-phase inverter includes phase-legs of two switches, each phase leg connected to one phase of the six phase windings;
   wherein the phase-legs are arranged into at least two phase groups corresponding to the at least two windings groups;
   wherein, to maintain a common-mode voltage at zero, a switching pattern for the switches of a first phase group of the at least two phase groups is complementary to a switching pattern for the switches of a second phase group of the at least two phase groups.

2. The motor and drive system of claim 1, wherein common-mode noises are conducted through the six phase windings of the six-phase machine through at least one parasitic capacitor to a ground during the zero common-mode pulse width modulation.

3. The motor and drive system of claim 1, wherein the six phase windings are distributed at a 60 degrees difference in space.

4. The motor and drive system of claim 1, wherein the each windings group forms a three-phase, 120° phase-shift machine.

5. The motor and drive system of claim 1, wherein the six phase windings include at least two separate neutral connections, where a maximum modulation index is approximate to 1.15.

6. The motor and drive system of claim 1, wherein a parasitic capacitance between windings and ground is modeled as one common-mode capacitor for a common-neutral connection or two substantially equal common-mode capacitors for two separate neutral connections.

7. The motor and drive system of claim 1, wherein the six phase windings include a common neutral connection, where a maximum modulation index is 1.

8. The motor and drive system of claim 2, wherein the at least one parasitic capacitor is a single parasitic common-mode capacitors that concentrates a common-mode capacitance from a common neutral connection.

9. The motor and drive system of claim 1, wherein the six-phase inverter includes twelve switches.

10. The motor and drive system of claim 1, wherein the switching pattern is generated by reversing duty cycles and carriers for the first phase group when generating switching actions for a the second phase group.

11. The motor and drive system of claim 1 is included in a ropeless elevator system.

* * * * *